United States Patent [19]

Crozier

[11] Patent Number: 5,081,700
[45] Date of Patent: Jan. 14, 1992

[54] APPARATUS FOR HIGH SPEED IMAGE ROTATION

[75] Inventor: George W. Crozier, Hatfield, Pa.
[73] Assignee: Unisys Corporation, Blue Bell, Pa.
[21] Appl. No.: 311,012
[22] Filed: Feb. 15, 1989
[51] Int. Cl.⁵ .......................................... G06F 15/62
[52] U.S. Cl. .................................... 395/150; 395/137
[58] Field of Search ... 364/518, 521, 522, 200 MS File, 364/900 MS File; 382/44-48

[56] References Cited

U.S. PATENT DOCUMENTS

| | | | |
|---|---|---|---|
| 4,099,258 | 7/1978 | Parsons | 364/900 |
| 4,099,259 | 7/1978 | Parsons et al. | 364/900 |
| 4,215,401 | 7/1980 | Holsztynski et al. | 382/49 X |
| 4,636,783 | 1/1987 | Omachi | 382/46 X |
| 4,703,515 | 10/1987 | Baroody, Jr. | 382/46 |
| 4,776,026 | 10/1988 | Ueyama | 340/789 X |
| 4,779,223 | 10/1988 | Asai et al. | 364/900 |
| 4,797,852 | 1/1989 | Nanda | 364/900 |
| 4,831,368 | 5/1989 | Masimo et al. | 340/723 X |

Primary Examiner—Heather R. Herndon
Attorney, Agent, or Firm—John B. Sowell; Mark T. Starr

[57] ABSTRACT

Apparatus for shifting the output of a bit matrix character generator ninety degrees to provide ninety degrees shifted characters and comprises a barrel shifter for barrel shifting bit slices of the bit matrix characters coupled to a linear array shifter for linear array shifting the information that was first barrel shifted. A feedback loop which includes a rotate RAM memory having its output connected to the input of the barrel shifter means to twice barrel shift the information which was previously barrel shifted and then linear array shifted to provide a bit matrix character output which is rotated ninety degrees from the original bit matrix character provided at the output of the character generator.

10 Claims, 4 Drawing Sheets

Fig. 5

```
    S8              S1
    ↓               ↓
    a b c d e f g h
    i j k l m n o p
    q r s t u v w x
    y z 1 2 3 4 5 6     (A)
    7 8 9 A B C D E
    F G H I J K L M
    N O P Q R S T U
    V W X Y Z ? ! $
       ORIGINAL ARRAY i r 1 A J S ! h
    q z 9 I R ? g p
    y 8 H Q Z f o x
    7 G P Y e n w 6
    F O X d m v 5 E     (B)
    N W c l u 4 D M
    V b k t 3 C L U
    a j s 2 B K T $
       BARREL SHIFT 1 h i r 1 A J S !  ←R8
    g p q z 9 I R ?
    f o x y 8 H Q Z
    e n w 6 7 G P Y
    d m v 5 E F O X     (C)
    c l u 4 D M N W
    b k t 3 C L U V
    a j s 2 B K T $  ←R1
       LINEAR SHIFT h p x 6 E M U $
    g o w 5 D L T !
    f n v 4 C K S ?
    e m u 3 B J R Z
    d l t 2 A I Q Y     (D)
    c k s 1 9 H P X
    b j r z 8 G O W
    a i q y 7 F N V
       BARREL SHIFT 2
```

APPARATUS FOR HIGH SPEED IMAGE ROTATION

BACKGROUND OF THE INVENTION

1. Related Applications

This application is an improvement in my copending application Ser. No. 06/836,285 filed 5 March 1986 for "Text Orientation System For Dot Matrix Printers".

2. Field of the Invention

The present invention relates to apparatus for rotating characters of the type generated by character generators in any desired image font or format. More particularly, the present invention relates to a novel high speed circuit for rotating a character, micro column word by by micro column word as it is generated or read out of a character generator memory.

3. Description of the Prior Art

In my aforementioned copending application Ser. No. 06/836,285, a complete form called a logical page could be generated and the logical page could be rotated 90°, 180° or 270° from the zero position. The logical circuitry employed to make the transformation or rotation of a logical page required that two complete characters be stored in a character matrix format in a character generator memory oriented 90° from each other. By storing whole characters, the characters could be scanned or read out of the memory buffer at high speed so that information being read out of memory could be accomplished at speeds sufficiently high to supply information for a laser printer or a laser printer engine. A second purpose for using two rotated characters in the character generator memory made it possible to flip or rotate either character being read out of memory by 180° so that the two stored characters provided the means for presenting the two characters in one of four rotational positions.

The character generator memory in this prior art reference was found to be commercially successful and reliable even though approximately 5,000 bits of memory are utilized for each 50 bit character to be generated. It is well known that thousands of characters are provided with laser printers and the cost of the character generator memory is substantially doubled when characters are stored in two rotational positions.

It would be desirable to maintain a laser printer or dot matrix printer system of the type disclosed in my copending application with the same number of characters in the character generator employing less character generator memory.

SUMMARY OF THE INVENTION

It is a principal object of the present invention to provide an improved high speed character generator.

It is another principal object of the present invention to provide novel logic circuitry for rotating a character stored in a character memory in the form of a bit matrix.

It is another principal object of the present invention to provide logic circuitry for rotating a single bit matrix character stored in memory by 90°.

It is another object of the present invention to provide logic loop circuitry for rotating a bit matrix character by 90°.

It is another object of the present invention to provide a logic circuit loop comprising a barrel shifter and a linear array shifter for rotating characters stored in a memory by 90°.

According to these and other objects of the present invention, there is provided means for reading micro column word slices of a bit matrix character out of memory one word slice at a time into a barrel shifter. The first pass output of the barrel shifter is routed through a linear array shifter and fed back to the input of the barrel shifter. The second pass output of the barrel shifter rotates the word slices to provide a bit matrix character which is rotated 90° from the first pass bit matrix character read from memory

BRIEF DESCRIPTION OF THE DRAWINGS

FIGS. 5A to 5D are diagrammatic representations of the rotation of the bit positions of a character using alphanumeric characters; and FIGS. 6A to 6D are diagrammatic representations of four bits of a fifty bit character that passes through the linear array shifter.

DESCRIPTION OF THE PREFERRED EMBODIMENT

Figure 1:
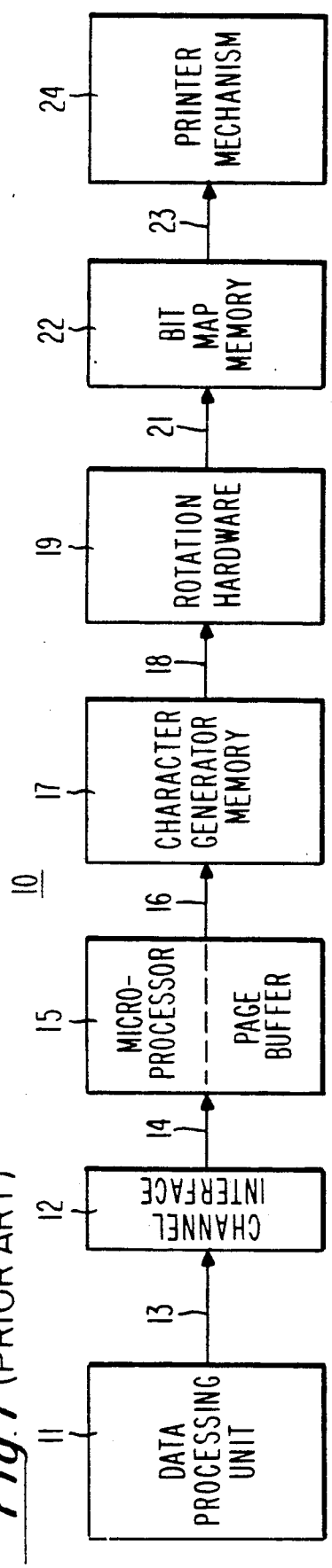
FIG. 1 is a block diagram of a prior art printer system for a laser printer.

Refer now to FIG. 1 showing a prior art block diagram printer system 10 of the type used for laser printers. The logical page information to be printed by the laser printer is presented by the data processing unit 11 to a channel interface 12 which adapts the information being presented on line 13 to an output on line 14 which may be utilized by microprocessor and page buffer 15. The output from microprocessor 15 on line 16 comprises character addresses and the positions of characters of the character generator memory 17 which is already loaded. The information presented on line 18 from character generator memory 17 is a word or micro column of a character which is presented in standard format to the rotational hardware 19. In this prior art printer system 10 the rotational hardware 19 is preferably that hardware shown in my aforementioned application Ser. No. 836,285. As will be explained hereinafter, the present invention is an improvement of part of the rotational hardware 19 shown in this previous application.

The rotated character information on line 21 is also page positioned when it is loaded into bit map memory 22 to provide a complete logical page in the form of dot matrix bits which can be scanned and read out on line 23 to a high speed laser printer or dot matrix printer mechanism 14.

Figure 2:
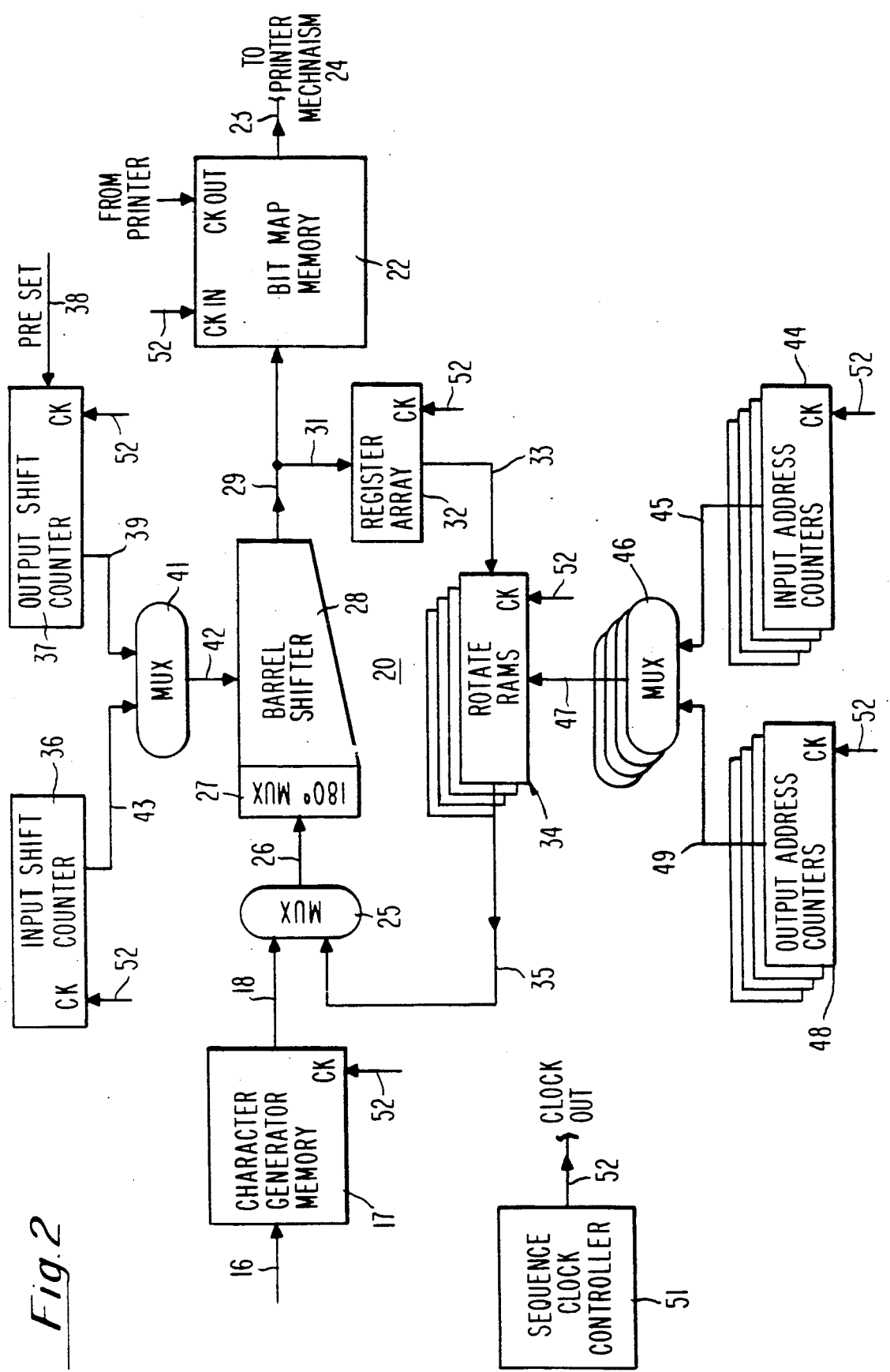
FIG. 2 is a block diagram of the present invention rotational hardware which comprises one of the block elements shown in FIG. 1.

Refer now to FIG. 2 showing a block diagram of the preferred embodiment of the present invention rotational hardware 20 which can be substituted for the block 19 of FIG. 1. The micro column words being read out of character generator memory 17 on line 18 are first applied to a multiplexer 25 which is set for the first pass to provide an output on line 26 which passes through a 180° multiplexer 27 without alteration into a barrel shifter or end around shifter 28. The output of the barrel shifter 28 on line 29 enters the rotational loop circuitry at line 31 and is applied to the register array 32 before being applied via line 33 to a large random access memory designated rotate RAMS 34. A complete character is read slice by slice through barrel shifter 28 and further processed at register array 32 and then stored in rotate RAMS 34. The information in RAM 34 is read out on line 35 slice by slice and passes through MUX 25 which now inhibits the information on line 18 and enables the information on line 35 to pass to the 180° multiplexer 27 which may or may not be active depending on whether the character originally being read from memory 17 is to be inverted or rotated 180°. The information on line 26 at the output of MUX 25 is again barrel shifted in barrel shifter 28 before being again applied to the output line 29 where it is now stored slice by slice or micro column word by micro column word in bit map memory 22 to prepare a logic page for printout by laser printer 24.

There are four distinct modes of operation of the information being presented at the output of character generator memory 17 on line 18. The information can be passed directly through the barrel shifter 28 without being end around shifted by disabling the input counter 36 and the output shift counter 37. The output shift counter 37 is provided with a preset number on line 38 from an associated microprocessor (not shown). This number preset in counter 37 is presented on line 39 to MUX 41 and on line 42 to the barrel shifter 28 so that a word slice passing through the barrel shifter without an end around barrel rotation was positioned before being stored in the bit map memory 22 via line 29.

A second mode of operation permits the character read out of memory 17 to be reverse column scanned and rotated 180° by the 180° multiplexer 27 before being positioned by the output shift counter 37 and barrel shifter 28 before being stored into bit map memory 22 via line 29.

A third (and fourth) mode of operation permits the character stored in memory 17 to be forward scanned (or reverse scanned) and presented slice by slice as a micro column word on line 18 and pass through multiplexers 25 and 27 for a first pass operation where it is barrel shifted by employing input shift counter 36 and its control signal line 43, multiplexer 41 and signal line 42 to barrel shift 28 each micro column word during the first pass operation. The barrel shifted micro column word on lines 29 and 31 are applied to the register array 32 which delays and processes the input signals as will be explained in greater detail hereinafter. The processed signals on line 33 are stored micro column word slice by word slice in rotate RAMS 34 under control of input address counter 44, line 45, multiplexer 46 and control line 47. After the complete character is stored in rotate RAMS 34 it is read out on line 35 under control of the output address counters 48, line 49, MUX 46 and control line 47. The micro column word slices being presented on line 35 are now passed through the MUX 25 for a second pass through the barrel shifter 28 and presented as an output on line 29 before being stored micro column word slice by word slice in bit map memory 22 in a 90° rotational bit position. If the character read out of memory 17 was reverse scanned, it is flipped 180° by the 180° multiplexer 27 during the second pass so that the character stored in bit map memory 22 is oriented 180° from the 90° rotational position described hereinbefore.

To coordinate the sequence of operations of the present invention rotational hardware, there is provided a sequence clock controller 51 which provides a sequence or plurality of timing clock signals on output line 52 which is applied to all of the logic blocks which require coordination and timing as shown. It will be noted that input clocks and output clocks are applied to the counters and are operable at different phases or periods of the clock. In similar manner, the bit map memory 22 requires an input and output clock signal, however, the output clock signal is supplied from the laser printer or dot matrix printer 24. The barrel shifter 28 is similar to those which are commercially available and does not require a clock signal. The rotate RAMS 34 are arranged as thirteen 4×50+ RAM chips to provide the equivalent of 50+ by 50+ RAM capacity. RAM buffer 34 permits one character to be loaded into the RAM memory 34 while a second character is being read out, thus enhancing the speed of operation of the rotational hardware 20. It will be understood that there is a register array 32 for each of the RAM chips and there is an individual input counter 44, output counter 48 and MUX 46 for each of 4×50+ RAM chips which will be explained in greater detail hereinafter.

Figure 3:
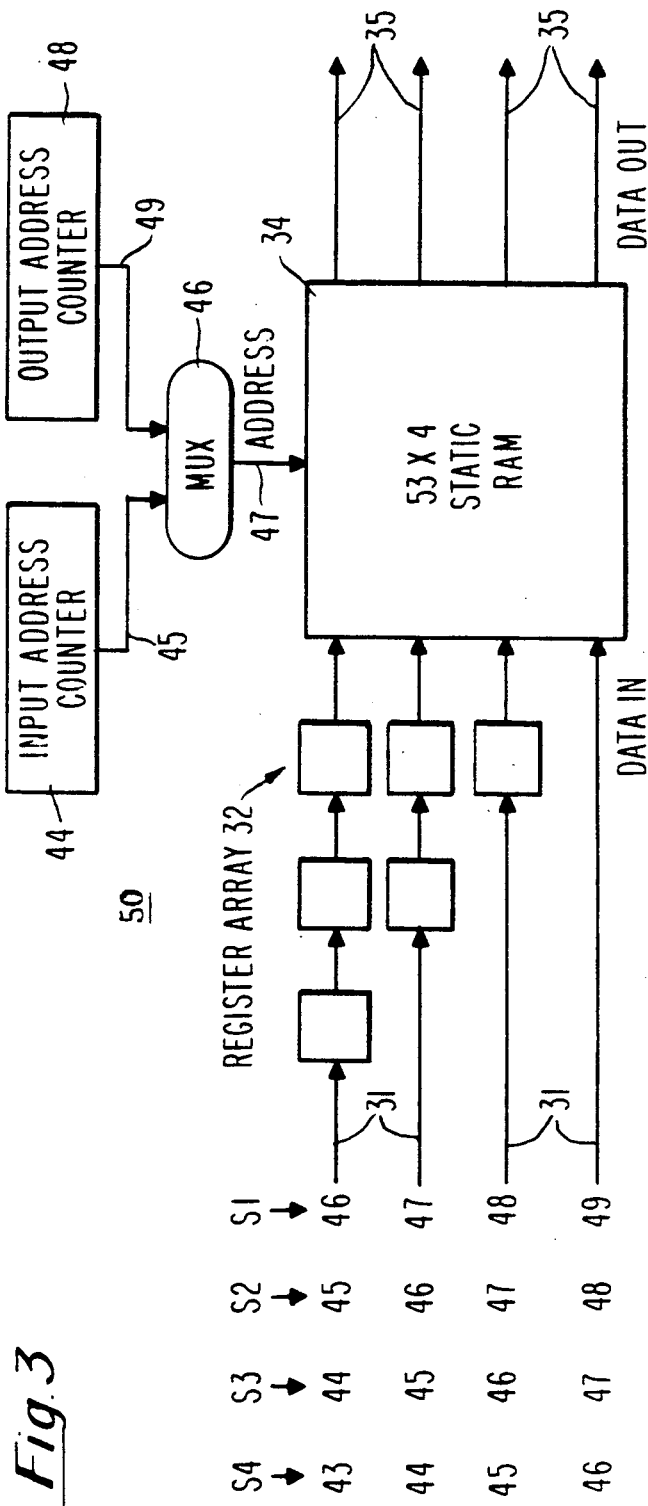
FIG. 3 is a more detailed, block diagram of a linear array shifter of the type shown in the feedback loop of FIG. 2.

Refer now to FIG. 3 showing a more detailed block diagram of the linear array shifter 50 in the feedback loop of the rotational hardware 20. For purposes of definition the feedback loop comprises all of the elements connected to the loop comprising elements 31 through 35. For purposes of explanation of FIG. 3, assume that the bit positions 43 through 49 of a fifty bit micro column word slice are being presented on input lines 31 to the register array 32 that comprises a plurality of individual shift registers which operate as delay registers. The bit positions 46 through 49 shown opposite the arrow S1 diagrammatically indicate that micro column slice 1 has not had its bit positions 46 through 49 rotated. Information in bit position 49 of slice 1 is applied to the input of static RAM 34 without any delay. Bit positions 48, 47 and 46 are shown having their information bit positions delayed by 1, 2 and 3 shift register stages before being applied to the static RAM 34. For purposes of this explanation, assume that the static RAM is a 53×4 portion of a RAM chip which will accommodate 4 bit positions of a 50×50 character or image which is stored in memory 17. In similar manner, the bit positions for micro column 2, 3 and 4 shown as slices S2, S3 and S4 are applied to the input bus 31 and clocked into the static RAM 34 with their 4 bit positions being delayed 1, 2 or 3 write access times. During subsequent operations, the information loaded as data into static RAM 34 can be read out on bus 35. As explained hereinbefore, one RAM element is being loaded at the same time a second RAM element is being read out so that a continuous operation of writing in and reading out is overlapping and occurring. It will be noted that the four bit positions 46 through 49 are only one-thirteenth of a micro column having 50 bit positions, thus, the 53×4 RAM 34 which accommodates a complete micro column of bit positions require 13 similar 53×4 static RAMS. It has been found that a 50×50 dot matrix is sufficiently dense to accommodate any known type of font or character as well as hieroglyphics, Sanskrit and Asian characters.

Figure 4:
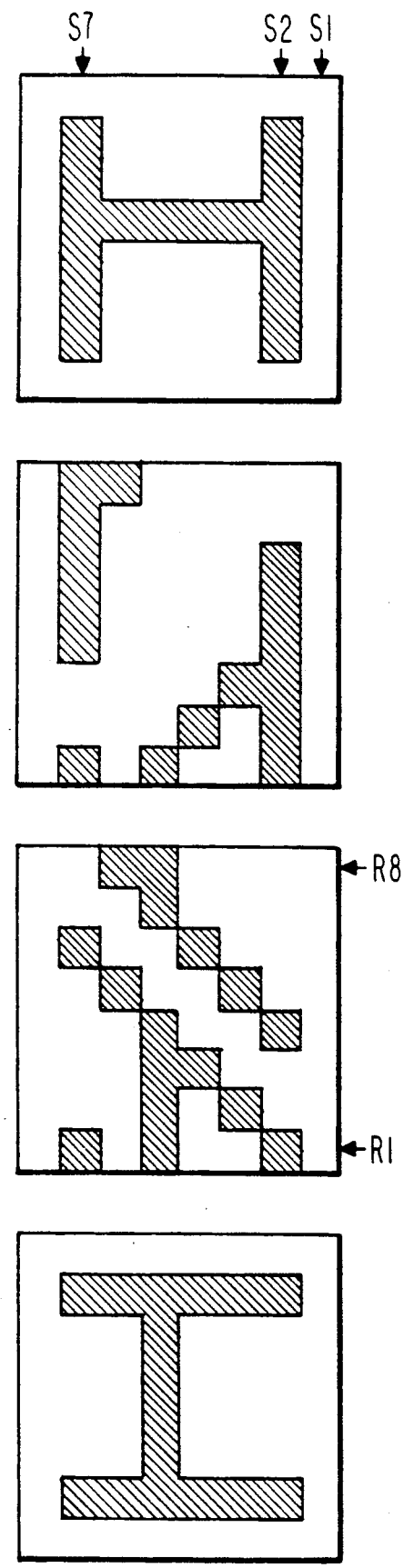
FIGS. 4A to 4D are diagrammatic representations of a character image as it is processed in the rotational hardware of FIG. 2.

Refer now to FIGS. 4A to 4D which provide a diagrammatic representation of the character image as it is processed in the rotational hardware 20. While the character H shown in FIG. 4 is only an 8×8 matrix, it will illustrate the functional operation of the present invention rotational hardware. Assume that the H shown in FIG. 4A has been read out of character memory 17 slice by slice as the original image and is to be rotated 90°. The barrel shifter 28 performs an end around barrel barrel shift of the dot matrix positions under control of the input counter 36 to provide a barrel shifted character which may be diagrammatically represented in FIG. 4B as it would appear on line 31 at the output of the barrel shifter 28. FIG. 4C is a dot matrix representation of the character shown in FIG. 4B after being stored in the rotate RAMS 34 and read out to provide final linear array shifting of the horizontal columns of the array shown in FIG. 4B and presented on output line 35. The information on line 35 represented in FIG. 4C is passed through the barrel shifter 28 for a second pass and appears as a character on output line 29 having been rotated 90° as shown in FIG. 4D.

The preferred embodiment barrel shifter 28 shifts the first slice or micro column word shown as S1 in FIG. 4A by no bit positions. Slice S2 is shifted by one bit position which is clearly shown in FIG. 4B where the horizontal leg of the H on the right side has moved down one bit position. In similar manner the slices or micro columns S1 through S8 are shifted zero to 7 positions, thus, slice S7 shown in FIG. 4 has been shifted end around 6 positions as shown in FIG. 4B. In a similar manner, the linear array shifter performs an end around shift in the horizontal or row direction similar to the barrel shifter just described. Row R1, shown in FIG. 4C, is shifted no bit positions and the row R8 shown in FIG. 4C is shifted 7 bit positions from the character shown in FIG. 4B. The character shown in FIG. 4C is the information of the type which appears on line 35 to the input of MUX 25 and barrel shifter 28. After the information passes through the barrel shifter during the second pass, the information shown in FIG. 4C is again barrel shifted to provide the 90° rotated character shown in FIG. 4D on output line 29 which is then stored in bit memory 22.

Refer now to FIGS. 5A to 5D showing a further diagrammatic representation of the rotation of a character using alphanumeric bit positions. It will be noted that slice or word column S1 when translated from FIG. 5A to 5B has no end around barrel shift rotation. Micro columns S2 through S8 have been barrel shifted by 1 through 7 bit positions respectively as shown in FIG. 5B. The end around bit shifted character 5B is further linear array shifted by end around shifting the horizontal rows R1 through R8 zero through seven bit positions to provide the information in FIG. 5C at the input of the barrel shifter 28 via line 35. This information is again barrel shifted during the second pass as explained with reference to FIG. 5A to provide a character having bit positions or alphanumeric bit positions as shown in FIG. 5B which is the equivalent of the character H shifted 90° as shown in FIG. 4D. Stated differently, the matrix of alphanumeric character shown in FIG. 5D have been rotated 90° in the counterclockwise direction when shown in FIG. 5D.

Refer now to FIG. 6A to 6D which is a diagrammatic representation of the 4 bits of a 50 bit character previously discussed with reference to FIG. 3. FIG. 6A shows the same 4×4 matrix of bit positions being applied to the input of the register array 32. To conform the bit positions to the same explanation employed with FIGS. 4 and 5, FIG. 6A represents the information in micro column or word slice format which appears at the output of character generator memory 17. FIG. 6B represents the information having been barrel shifted which appears on line 31 at the input to the register array 32 as shown in FIG. 3. The information shown in FIG. 6C is the information which appears on the output lines 35 shown in FIG. 3 and is similar to four of the fifty bits of information being presented on output line 35 of FIG. 2. Thus, it will be understood that the information shown in FIG. 6D is the format of the information which appears on output line 29 after the second pass through the barrel shifter 28. In the attempt to show how a matrix of 50×50 bits is processed in the novel rotational hardware, the first barrel shift operation of the information in FIG. 6C has shifted all but one of the 49 bits to another part of the matrix (not shown). However, in FIG. 6D the missing three 49 bits and missing two 48 bits and missing one 47 bit is again shifted back into the 4×4 matrix so that bit position 53, shown as 49 in the square, of FIG. 6A appears as the bit position 54 shown rotated 90° as a bit 49 in the square of FIG. 6D. Thus, it is shown that FIG. 6A is rotated 90° counterclockwise to provide the information in FIG. 6D as previously explained with reference to FIGS. 4 and 5.

It might be asked why not use a massive look-up table to perform the transformation of the bit positions. It is not practical to store 10,000 characters in 50×50 bit position matrix format and perform a parallel read out transformation with a known addressable memory. Having explained the preferred embodiment of the present invention, it will now be understood that the size of the character generator memory 17 employed in my prior art copending application Ser. No. 836,285 has been reduced by a factor greater than two in that the hardware shown in FIG. 2 can be physically placed at the output of the character generator memory 17 shown in my copending application to provide input information for the bit map memory 22.

What is claimed is:

1. Apparatus for shifting the output of a bit matrix character generator ninety degrees, comprising:
   barrel shifter means for receiving as an input a bit matrix character and producing a barrel shifted output by parallel shifting the bits of successive micro column words of said bit matrix characters by one additional bit per column,
   linear array shifter means having an input coupled to the output of said barrel shifter for linear array shifting said barrel shifted input by shifting the successive rows of the barrel shifted bit matrix character output by one additional bit per row providing a twice shifted output, and
   said twice shifted output from said linear array shifter being fed back to the input of said barrel shifter to provide a thrice shifted bit matrix character output which is rotated 90 degrees from the optical bit matrix character.

2. Apparatus for shifting characters as set forth in claim 1 wherein said linear array shifter means comprises a plurality of delay shift register stages and a plurality of random access memory chips coupled to the output of said delay register stages.

3. Apparatus for shifting characters as set forth in claim 2 wherein said linear array shifter means further comprises an input address counter and an output address counter.

4. Apparatus for shifting characters as set forth in claim 3 wherein said linear array shifter further comprises a multiplexer coupled between said random access memory chips and said address counter for selecting one or the other of said address counters.

5. Apparatus for shifting characters as set forth in claim 1 wherein said barrel shifter means comprises an input address counter and an output address counter and a barrel shifter.

6. Apparatus for shifting characters as set forth in claim 5 wherein said barrel shifter means further comprises a multiplexer coupled between the barrel shifter and said address counters.

7. Apparatus for shifting characters as set forth in claim 6 wherein said barrel shifter means further comprises a second multiplexer coupled between the output of said bit matrix character generator and the input of said barrel shifter.

8. Apparatus for shifting characters as set forth in claim 5 which further includes means for presetting a count in said output address counter of said barrel shifter means which further includes counter load logic means coupled to said counter means for presetting said output shift counter of said barrel shifter means.

9. Apparatus for shifting characters as set forth in claim 5 wherein said barrel shifter means further comprises a 180 degree multiplexer connected to the input of the barrel shifter.

10. Apparatus for shifting coded characters in a prearranged format by ninety degrees and storing the shifted characters in a bit map memory as bit matrix characters, comprising:

buffer memory means having a plurality of characters stored therein in a prearranged format in coded form, character generator means coupled to said buffer memory means for generating micro column words of a bit matrix character to be shifted by ninety degrees, barrel shifter means coupled to said character generator means for receiving as an input said micro column words of bit matrix characters to be shifted and for producing a barrel shifted output by parallel shifting the bits of successive micro column words of said bit matrix character by one additional bit per column, linear array shifter means coupled to said barrel shifted output of said barrel shifter means for shifting the successive rows of the barrel shifted bit matrix characters by one additional bit per row, said linear array shifter means output being coupled to the input of said barrel shifter means to produce an output from said barrel shifter means which has been shifted a third time and to provide a bit character output which has been rotated 90 degrees in said prearranged format, and bit map memory means coupled to the output of said barrel shifter means for storing said plurality of characters in a said per arranged format in bit matrix form.

* * * * *